United States Patent
Cronauer et al.

(10) Patent No.: US 12,008,021 B2
(45) Date of Patent: Jun. 11, 2024

(54) DATA RECONCILIATION SYSTEM

(71) Applicant: Donyati, LLC, Golden, CO (US)

(72) Inventors: Michael Cronauer, Acworth, GA (US); Aparna O. Kallada, Bangalore (IN)

(73) Assignee: Donyati, LLC, Golden, CO (US)

( * ) Notice: Subject to any disclaimer, the term of this patent is extended or adjusted under 35 U.S.C. 154(b) by 0 days.

(21) Appl. No.: 18/191,132

(22) Filed: Mar. 28, 2023

(65) Prior Publication Data

US 2023/0315761 A1 Oct. 5, 2023

Related U.S. Application Data

(60) Provisional application No. 63/362,340, filed on Apr. 1, 2022.

(51) Int. Cl.
*G06F 16/28* (2019.01)
*G06F 16/26* (2019.01)

(52) U.S. Cl.
CPC ............ *G06F 16/283* (2019.01); *G06F 16/26* (2019.01)

(58) Field of Classification Search
CPC ................ G06F 16/283; G06F 16/26
See application file for complete search history.

(56) References Cited

U.S. PATENT DOCUMENTS

| | | | | |
|---|---|---|---|---|
| 7,970,795 | B2 * | 6/2011 | Kemp | G06F 16/283 707/802 |
| 2005/0055324 | A1 * | 3/2005 | Godeby | G06Q 40/12 |
| 2007/0112864 | A1 | 5/2007 | Ben-Natan | |
| 2008/0043951 | A1 | 2/2008 | Yap Ye et al. | |
| 2010/0174627 | A1 | 7/2010 | Daniels | |
| 2011/0035408 | A1 | 2/2011 | Hotz | |
| 2016/0217401 | A1 * | 7/2016 | Leung | G06Q 10/06311 |
| 2017/0116304 | A1 * | 4/2017 | Hladik, Jr. | G06Q 30/00 |
| 2020/0401569 | A1 * | 12/2020 | Kumar | G06F 16/273 |
| 2022/0101322 | A1 * | 3/2022 | Gimple | G06Q 20/4014 |

OTHER PUBLICATIONS

International Search Report and Written Opinion of the International Searching Authority from the International Searching Authority for International Application No. PCT/US2023/525300 dated Jun. 15, 2023, 7 pages.

* cited by examiner

*Primary Examiner* — Hares Jami
(74) *Attorney, Agent, or Firm* — HONIGMAN LLP

(57) ABSTRACT

A method includes receiving a data reconciliation request requesting data reconciliation for a first dataset and a second dataset. The method also includes obtaining the first dataset including one or more dimensions each having a plurality of dimension members and obtaining the second dataset including one or more dimensions each having a plurality of dimension members. For each dimension of the first dataset, the method includes obtaining a bridge member that associates the respective dimension of the first dataset with a dimension of the second dataset. The method includes generating a first and second set of combination dimension members and refreshing the first and second set of combination dimension members using an execution delimiter value. The method includes generating, using the refreshed first and second set of combination dimension members, a third set of combination dimension members to generate a data reconciliation report.

20 Claims, 23 Drawing Sheets

| Run Name ↕ ▽ 362 | Description ↕ 364 | ▽ | Status ↕ ▽ 366 | Created ↕ ▽ 368 | Created On ↕ ▽ 368 |
|---|---|---|---|---|---|
| Test_13/03/2023 | | | ● | Admin | 03-13-2023 06:40:35 |
| Export Deepak | | | ● | Admin | 03-10-2023 14:52:49 |
| Test freitag | | | ● | Admin | 03-10-2023 05:55:56 |
| Demo | Deepak Demo | | ● | Admin | 03-07-2023 09:33:26 |

App1 135a 401, 401b

| Dimension ↑↓ 132 | ▽ | Dim In File ↑↓ 442 | ▽ | Yes-Type Field ↑↓ 444 | ▽ | No-Type Top Member ↑↓ 446 |
|---|---|---|---|---|---|---|
| Year | | NO | | | | 2022 |
| Period | | NO | | | | Jan |
| Amount | | YES | | 4 | | |
| Account | | YES | | 2 | | |
| Entity | | YES | | 1 | | |

FIG. 4C 401, 401c

App2 135a

| Dimension ↑↓ 132 | ▽ | Dim In File ↑↓ 442 | ▽ | Yes-Type Field ↑↓ 444 | ▽ | No-Type Top Member ↑↓ 446 |
|---|---|---|---|---|---|---|
| Year | | NO | | | | 2022 |
| Period | | NO | | | | Jan |
| Amount | | YES | | 4 | | |
| Acct | | YES | | 2 | | |
| Ent | | YES | | 1 | | |

FIG. 4D

| App1·App2 ↑↓ 136, 136a | Year·Year ↑↓ 136, 136b | Period·Period ↑↓ 136, 136c | Account·Acct ↑↓ 136, 136d | Entity·Ent ↑↓ 136, 136e |
|---|---|---|---|---|
| App1 | 2022 | Jan | 500 | NE |
| App1 | 2022 | Jan | 501 | NE |
| App1 | 2022 | Jan | 600 | NE |
| App1 | 2022 | Jan | 501 | SE |
| App1 | 2022 | Jan | 601 | SE |
| App1 | 2022 | Jan | 502 | MW |
| App1 | 2022 | Jan | 602 | MW |
| App2 | 2022 | Jan | 500x | NorthEast |
| App2 | 2022 | Jan | 501x | NorthEast |

| Dimension Name ↕ ▽ 132 | Source Members ↕ ▽ 134 | Flip Sign ↕ ▽ 602 | Bridge Members ↕ ▽ 136 |
|---|---|---|---|
| Year | 2022 | No | 2022 |
| Period | Jan | No | Jan |
| Account | 600 | No | EXP |
| Account | 500 | No | REV |

FIG. 6B

| Dimension Name ↑↓ ▽ 132 | Source Members ↑↓ ▽ 134 | Flip Sign ↑↓ ▽ 602 | Bridge Members ↑↓ ▽ 136 |
|---|---|---|---|
| Year | 2022 | No | 2022 |
| Period | Jan | No | Jan |
| Func | NONE | No | NONE |
| Func | RD | No | RD |

| App1 App2 ↑↓ 135 | Year Year ↑↓ 132 | bridge Year Year ↑↓ 136 | Account Acct ↑↓ 132 | bridge Account Acct ↑↓ 136 |
|---|---|---|---|---|
| App1 | 2022 | 2022 | 500 | REV |
| App1 | 2022 | 2022 | 501 | REV |
| App1 | 2022 | 2022 | 600 | EXP |
| App1 | 2022 | 2022 | 501 | REV |
| App1 | 2022 | 2022 | 601 | EXP |
| App1 | 2022 | 2022 | 502 | REV |
| App1 | 2022 | 2022 | 602 | EXP |
| App2 | 2022 | 2022 | 500x | REV |
| App2 | 2022 | 2022 | 501x | REV |
| App2 | 2022 | 2022 | 600x | EXP |

| Dimension Name ⇅ ▽ 132 | App1 Concatenation ⇅ ▽ 612 | Dimension Name ⇅ ▽ 132 | App2 Concatenation ⇅ ▽ 612 |
|---|---|---|---|
| Period | | Period | |
| Amount | | Amount | |
| Account | | Acct | |
| Entity | | Ent | |

FIG. 8B

| App1 App2 ↑↓ ∇ 135 | Year Year ↑↓ ∇ 132 | bridge Year Year ↑↓ ∇ 136 | Account Acct ↑↓ ∇ 132 | bridge Account Acct ↑↓ ∇ 136 |
|---|---|---|---|---|
| App1 | 2022 | 2022 | 500 | REV |
| App1 | 2022 | 2022 | 501 | REV |
| App1 | 2022 | 2022 | 600 | EXP |
| App1 | 2022 | 2022 | 501 | REV |
| App1 | 2022 | 2022 | 601 | EXP |
| App1 | 2022 | 2022 | 502 | REV |
| App1 | 2022 | 2022 | 602 | EXP |
| App2 | 2022 | 2022 | 501x | REV |
| App2 | 2022 | 2022 | 501x | REV |
| App2 | 2022 | 2022 | 601x | EXP |

FIG. 9B

| bridgesync-Account-Acct | bridgesync-Facility-Ent | Comments | 2022 Jan |
|---|---|---|---|
| EXP | MW | | 0.00 |
| EXP | NE | | 0.00 |
| EXP | 3S | | 0.00 |
| REV | MW | | 0.00 |
| REV | NE | | 10.00 |
| REV | NE | | 0.00 |
| REV | 3S | | 0.00 |

FIG. 10B

DATA RECONCILIATION SYSTEM

CROSS REFERENCE TO RELATED APPLICATION

This U.S. patent application claims priority under 35 U.S.C. § 119(e) to U.S. Provisional Application 63/362,340, filed on Apr. 1, 2022. The disclosure of this prior application is considered part of the disclosure of this application and is hereby incorporated by reference in its entirety.

TECHNICAL FIELD

This disclosure relates to data reconciliation.

BACKGROUND

Data reconciliation is a process for verifying data during or after, for example, data migration. That is, target data may be compared against original data to ensure that the data was properly migrated or in the case of system updates or changes, data that should have remained static did not change. In such a situation, data reconciliation procedures check for missing records or values, incorrect records or values, duplicated values or records, and various formatting issues. Conventional data reconciliation techniques are expensive, time consuming, error prone, or some combination thereof.

SUMMARY

One aspect of the disclosure provides a computer-implemented method that when executed on data processing hardware causes the data processing hardware to perform operations for data reconciliation. The operations include receiving a data reconciliation request requesting data reconciliation for a first dataset and a second dataset from a user device in communication with the data processing hardware. The operations also include obtaining the first dataset from a first data source. Here, the first dataset includes one or more dimensions each having a plurality of dimension members. The operations also include obtaining the second dataset from a second data source. Here, the second dataset includes one or more dimensions each having a plurality of dimension members. For each respective dimension of the first dataset, the operations also include obtaining a respective bridge member associating the respective dimension of the first dataset with a respective dimension of the second dataset. The operations also include generating a first set of combination dimension members using each pair of dimension members of the one or more dimensions of the first dataset and the respective bridge members. The operations also include generating a second set of combination dimension members using each pair of dimension members of the one or more dimensions of the second dataset and the respective bridge members. The operations also include refreshing the first set of combination dimension members and the second set of combination dimension members based on an execution delimiter value corresponding to a quantity of dimension members refreshed simultaneously. The operations also include generating a third set of combination dimension members using the refreshed first set of combination dimension members and the refreshed second set of combination dimension members and generating a data reconciliation report from the third set of combination dimension members.

Implementations of the disclosure may include one or more of the following optional features. In some implementations, refreshing the first set of combination dimension members and the second set of combination dimension members based on the execution delimiter value further includes refreshing the first set of combination dimension members based on a first execution delimiter value and refreshing the second set of combination dimension members based on a second execution delimiter value. Refreshing the generating the first set of combination dimension members and the second set of combination dimension members based on the execution delimiter value may further include obtaining an updated dimension member from the plurality of dimension members of the first dataset from the first data source and obtaining an updated dimension member from the plurality of dimension members of the second dataset from the second data source.

In some examples, generating the third set of combination members using the refreshed first set of combination dimension members and the refreshed second set of combination dimension members includes suppressing a portion of the combination dimension members. Here, the portion of the combination dimension members may include combination dimension members associated with a zero or no data. In these examples, suppressing the portion of the combination dimension members includes zeroing a second portion of the combination dimension members based on a variance threshold.

In some implementations, generating the third set of combination dimension members using the refreshed first set of combination dimension members and the refreshed second set of combination dimension members includes inversing values associated with the refreshed second set of combination dimension members. In other implementations, generating the third set of combination dimension members using the refreshed first set of combination dimension members and the refreshed second set of combination dimension members includes combining the refreshed first set of combination dimension members and the refreshed second set of dimension members into a linear format. The operations may further include sending the data reconciliation report to the user device. Here receiving the data reconciliation report causes the user device to display the data reconciliation report via a graphical user interface.

Another aspect of the disclosure provides a system that includes data processing hardware and memory hardware storing instructions that when executed on the data processing hardware causes the data processing hardware to perform operations. The operations include receiving a data reconciliation request requesting data reconciliation for a first dataset and a second dataset from a user device in communication with the data processing hardware. The operations also include obtaining the first dataset from a first data source. Here, the first dataset includes one or more dimensions each having a plurality of dimension members. The operations also include obtaining the second dataset from a second data source. Here, the second dataset includes one or more dimensions each having a plurality of dimension members. For each respective dimension of the first dataset, the operations also include obtaining a respective bridge member associating the respective dimension of the first dataset with a respective dimension of the second dataset. The operations also include generating a first set of combination dimension members using each pair of dimension members of the one or more dimensions of the first dataset and the respective bridge members. The operations also include generating a second set of combination dimension members using each pair of dimension members of the one or more dimensions of the second dataset and the respective bridge members. The operations also include refreshing the first set of combination dimension members and the second set of combination dimension members based on an execution delimiter value corresponding to a quantity of dimension members refreshed simultaneously. The operations also include generating a third set of combination dimension members using the refreshed first set of combination members and the refreshed second set of combination dimension members and generating a data reconciliation report from the third set of combination dimension members.

Implementations of the disclosure may include one or more of the following optional features. In some implementations, refreshing the first set of combination dimension members and the second set of combination dimension members based on the execution delimiter value further includes refreshing the first set of combination dimension members based on a first execution delimiter value and refreshing the second set of combination dimension members based on a second execution delimiter value. Refreshing the generating the first set of combination dimension members and the second set of combination dimension members based on the execution delimiter value may further include obtaining an updated dimension member from the plurality of dimension members of the first dataset from the first data source and obtaining an updated dimension member from the plurality of dimension members of the second dataset from the second data source.

In some examples, generating the third set of combination members using the refreshed first set of combination dimension members and the refreshed second set of combination dimension members includes suppressing a portion of the combination dimension members. Here, the portion of the combination dimension members may include combination dimension members associated with a zero or no data. In these examples, suppressing the portion of the combination dimension members includes zeroing a second portion of the combination dimension members based on a variance threshold.

In some implementations, generating the third set of combination dimension members using the refreshed first set of combination dimension members and the refreshed second set of combination dimension members includes inversing values associated with the refreshed second set of combination dimension members. In other implementations, generating the third set of combination dimension members using the refreshed first set of combination dimension members and the refreshed second set of combination dimension members includes combining the refreshed first set of combination dimension members and the refreshed second set of dimension members into a linear format. The operations may further include sending the data reconciliation report to the user device. Here receiving the data reconciliation report causes the user device to display the data reconciliation report via a graphical user interface.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3B illustrates an example graphical user interface (GUI) view of the reconciliation label module.

FIGS. 4B-4D illustrate example graphical user interface (GUI) views of the dimension linking module.

FIG. 5B illustrates an example graphical user interface (GUI) view of the import module.

FIGS. 6B and 6C illustrate example graphical user interface (GUI) views of the bridging module.

FIG. 7B illustrates an example graphical user interface (GUI) view of the bridge execution module.

FIG. 8B illustrates an example graphical user interface (GUI) view of the transformation identifier.

FIG. 9B illustrates an example graphical user interface (GUI) view of the transformation execution module.

FIG. 10B illustrates an example graphical user interface (GUI) view of the report execution module.

Like reference symbols in the various drawings indicate like elements.

DETAILED DESCRIPTION

Data reconciliation is a process for verifying data during or after, for example, data migration. For example, target data is compared against original data to ensure that the data was properly migrated or in the case of system updates or changes, data that should have remained static did not change. In such a situation, data reconciliation procedures check for missing records or values, incorrect records or values, duplicated values or records, and various formatting issues. Conventional data reconciliation techniques are expensive, time consuming, error prone, or some combination thereof.

Implementations herein are directed toward data reconciliation controller that not only decreases time required to start and perform data reconciliation (e.g., of financial data or other values), but to provide a more rich and valuable information trail that is more visible faster, thus allowing a user to focus on fixing problems instead of finding them. The data reconciliation controller exposes errors in approaches to fixing issues. For example, when an issue is improperly fixed, the data reconciliation controller allows a user to both find the issue and revert to a proper solution in less time. The data reconciliation controller employs methods that ensures users focus on what is important earlier in the process (e.g., items that frequently cause delays) for not just top and bottom layers, but every layer in-between. The data reconciliation tool provides auditing tools that allows a user practical ways to enter and filter information that enable drawing conclusions faster while simultaneously creating and maintaining an auditing trail.

Figure 1:
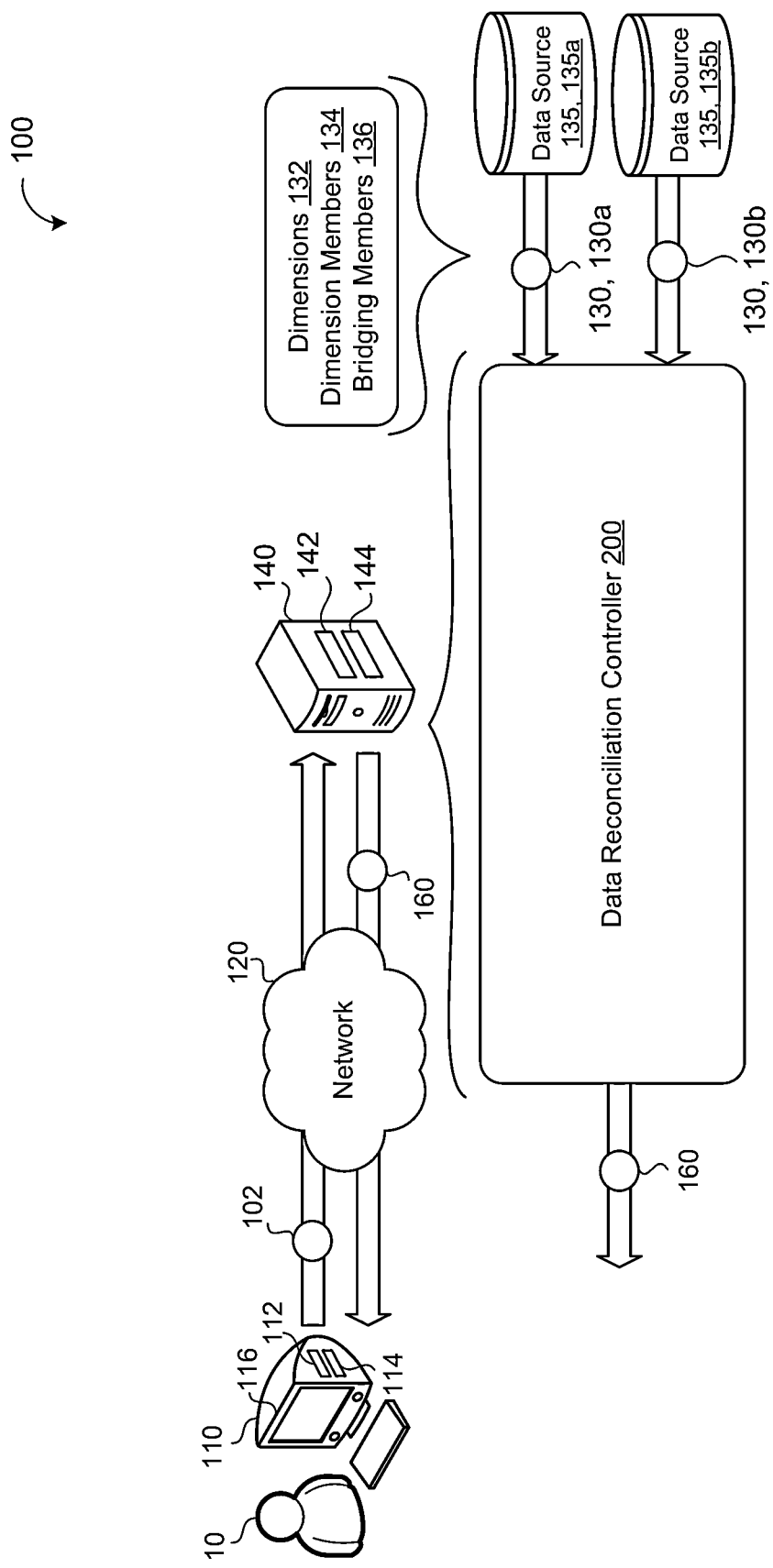
FIG. 1 is a schematic view of an example system for reconciling data.

Referring now to FIG. 1, in some implementations, an example system 100 includes a processing system 140 in communication with one or more user devices 110 via a network 120. The processing system 140 may be a single computer, multiple computers, a user device, or a distributed system (e.g., a cloud computing environment) having fixed or scalable/elastic computing resources 142 (e.g., data processing hardware) and/or storage resources 144 (e.g., memory hardware). Data sources 135 may be overlain on the storage resources 144 by one or more of the users (e.g., the user device 110) or the computing resources 142. The data source 135 is configured to store one or more datasets 130.

The processing system 140 is configured to receive a reconciliation request (e.g., data reconciliation request) 102 from the user device 110 associated with a respective user 10. The user device 110 may correspond to any computing device, such as a desktop workstation, a laptop workstation, or a mobile device (i.e., a smart phone). The user device 110 includes computing resources 112 (e.g., data processing hardware), storage resources 114 (e.g., memory hardware), and/or a display 116 (e.g., graphical user interface (GUI)). In some examples, the reconciliation request 102 includes a storage location of a first dataset 130, 130a stored at a first data source 135, 135a and a storage location of a second dataset 130, 130b stored at a second data source 135, 135b. Thus the reconciliation request requests data reconciliation for the first dataset 130a and the second dataset 130b. In other examples, the user 10 provides, via the user device 110, the first and second datasets 130a, 130b directly to the data reconciliation controller 200 as part of the reconciliation request 102.

The processing system 140 executes a data reconciliation controller 200 configured to reconcile the first and second datasets 130a, 130b based on (i.e., in response to) receiving the reconciliation request 102. Each data source 135 may be a relevant application (i.e., "app"), table, database, or any other source of the datasets 130 for reconciliation. As such, data source 135 may also interchangeably be referred to as "application 135 or app 135" herein. In some examples, the datasets 130 represent financial information (e.g., financial account balances, debts, credits, etc.) or other numerical data (e.g., inventory counts). In yet other examples, the datasets 130 include string values (e.g., employee names, locations, descriptions, etc.). In some examples, each dataset 130 includes a number of dimensions 132. Each dimension 132 may correspond with a column of data of the dataset 130. For instance, a dimension 132 may correspond to a column of data representing "Accounts" or "Year" data of the dataset 130. In some implementations, the data reconciliation controller 200 obtains or receives dimension alignment data. The dimension alignment data aligns the dimensions 132 of each dataset 130, for example, by bridge members 136. For instance, a first dimension 132 labeled as "Account" for a first dataset 130 may align with a second dimension 132 labeled as "Acct" for a second dataset 130, as discussed in more detail below.

Moreover, each dimension 132 includes one or more members 134 (e.g., dimension members) of the dimension 132. For example, the dimension "Account" may include a number of members (i.e., dimension members) 134 of different individuals or entities that have accounts for a server associated with the dataset 130, data source 135, or application. Here, each dimension member 134 represents a respective data value for the corresponding dimension 132. Along with the dimensions 132 of each dataset 130, the data reconciliation controller 200 obtains each dimension member 134 of the datasets 130 for reconciliation. Each dimension member 134 may correspond to a base member and/or a parent member. In some examples, one or more dimension members 134 include or are associated with one or more comments, annotations, and/or descriptions. For example, a user may provide a comment providing a brief description of one or more dimension members 134. The comments, for example, include details for auditing notes, cube or system definitions, to notate responsible parties, incorporate different codes to assist with different ways of filtering data, member exceptions to one or more general rules, etc.

FIGS. 2-10 illustrate various flowcharts of exemplary arrangements of operations and various GUI views of the data reconciliation controller 200 performing data reconciliation. It is understood that the flowcharts illustrated in FIGS. 2-10 are exemplary only and are not meant to limit this disclosure in any way. For example, the flowcharts may repeat any of the operations any number of times, include more or fewer operations, and/or perform any of the operations in a different order without departing from the scope of this disclosure. Moreover, the various GUI views may be displayed on the GUI 116 of the user device 110 whereby the user is able to provide user input to modify the GUI view and/or data.

Figure 2:
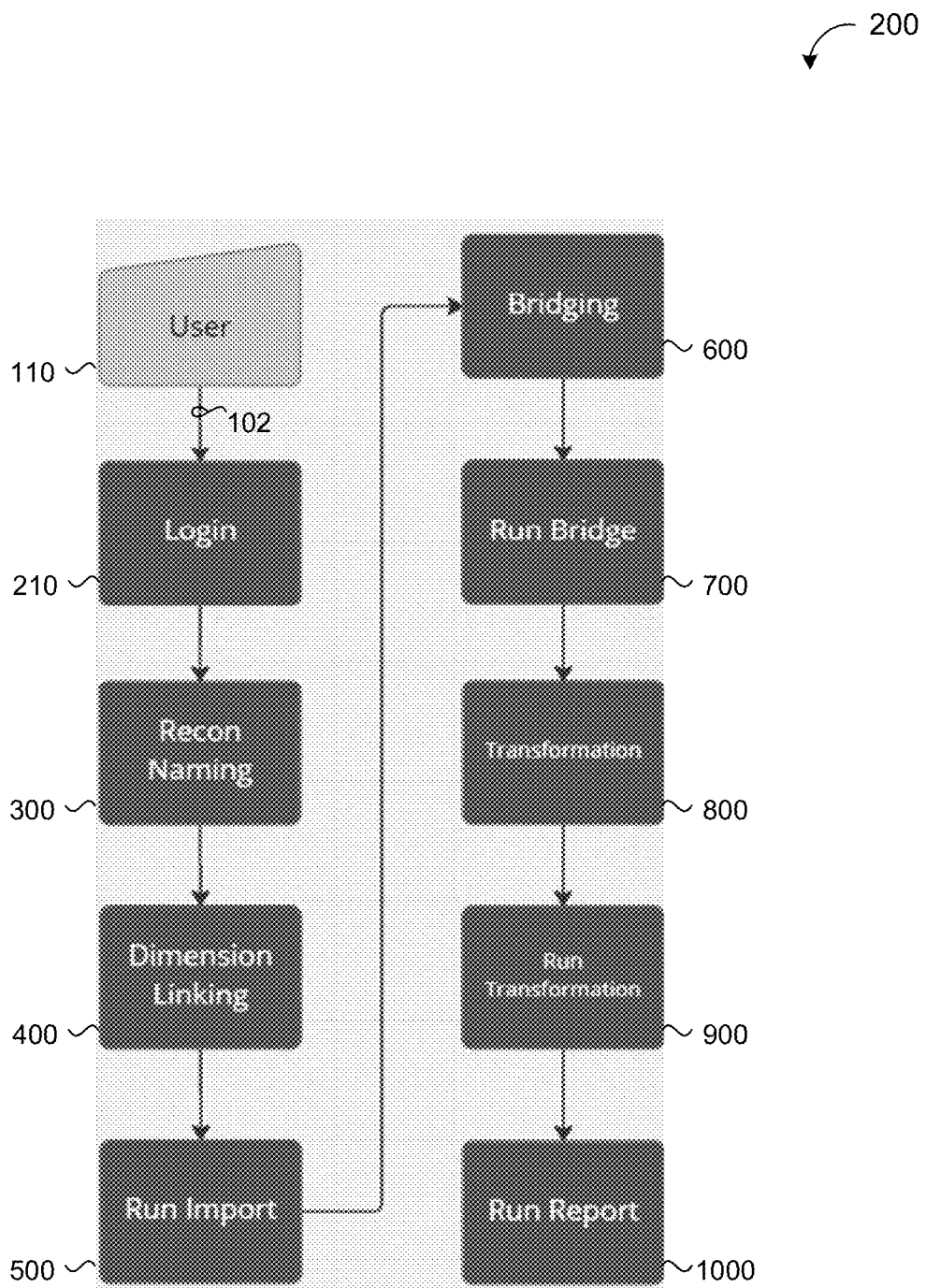
FIG. 2 illustrates a flowchart of exemplary arrangements of operations of a data reconciliation controller.

Referring now to FIG. 2, the data reconciliation controller 200 includes a user login operation 210, a reconciliation label (i.e., naming) module 300, a dimension linking module 400, an import module 500, a bridging module 600, a bridge execution module 700, a transformation identifier 800, a transformation execution module 900, and a report execution module 1000. The data reconciliation controller 200 is configured to reconcile one or more datasets 130 in response to receiving the reconciliation request 102. Each dataset 130 is stored at a respective data source 135, thus reconciliation of the datasets 130 may also by referred to as reconciliation of the data sources 135 (e.g., the datasets 130 stored at the respective data sources 135).

In some implementations, the reconciliation request 102 may be manually sent by the user 10 via the user device 110 (FIG. 1). In other implementations the reconciliation controller 200 generates the reconciliation request, thereby initiating the reconciliation process, based on detecting a trigger event. For example, the trigger event may be a timer such that reconciliation occurs at a fixed interval or a data modification event indicating a data update in one or more of the datasets 130. The user may configure the trigger event to be any trigger such that the data reconciliation controller 200 performs reconciliation in response to detecting the trigger event without any direct user interaction.

Accordingly, the data reconciliation controller 200 obtains the datasets 130 (e.g., from respective data sources 135) in response to receiving the reconciliation request 102. For example, the reconciliation request 102 may provide a user name, password, or any other credentials necessary to access the datasets 130 from respective data sources 135. In some examples, the data sources 135 are applications, and the data reconciliation controller 200 obtains a user name, a password, and a connection name for each application (e.g., from a user of the processing system 140 or a remote device in communication with the processing system 140). Here, the data reconciliation controller 200 authenticates the obtained user name and password for the respective applications 135 before retrieving datasets 130 from the data sources 135. The user 10 may manually provide some or all of the datasets 130 to the data reconciliation controller 200 via the GUI 116 (FIG. 1) of the user device 110 another interface executing on the user device 110 in communication with the processing system 140 or executing on the processing system 140 itself.

Users may have read access or read/write access to the datasets 130. For instance, a read access user may only read the datasets 130 and perform reconciliation while a user with read/write access (e.g., an administrator) may update data included in the datasets 130. Accordingly, the data reconciliation controller 200 may grant or deny a data reconciliation request 102 based on whether the respective user has read access, read/write access, or no access to the requested datasets for reconciliation (i.e., neither read access nor read/write access).

Figure 3A:
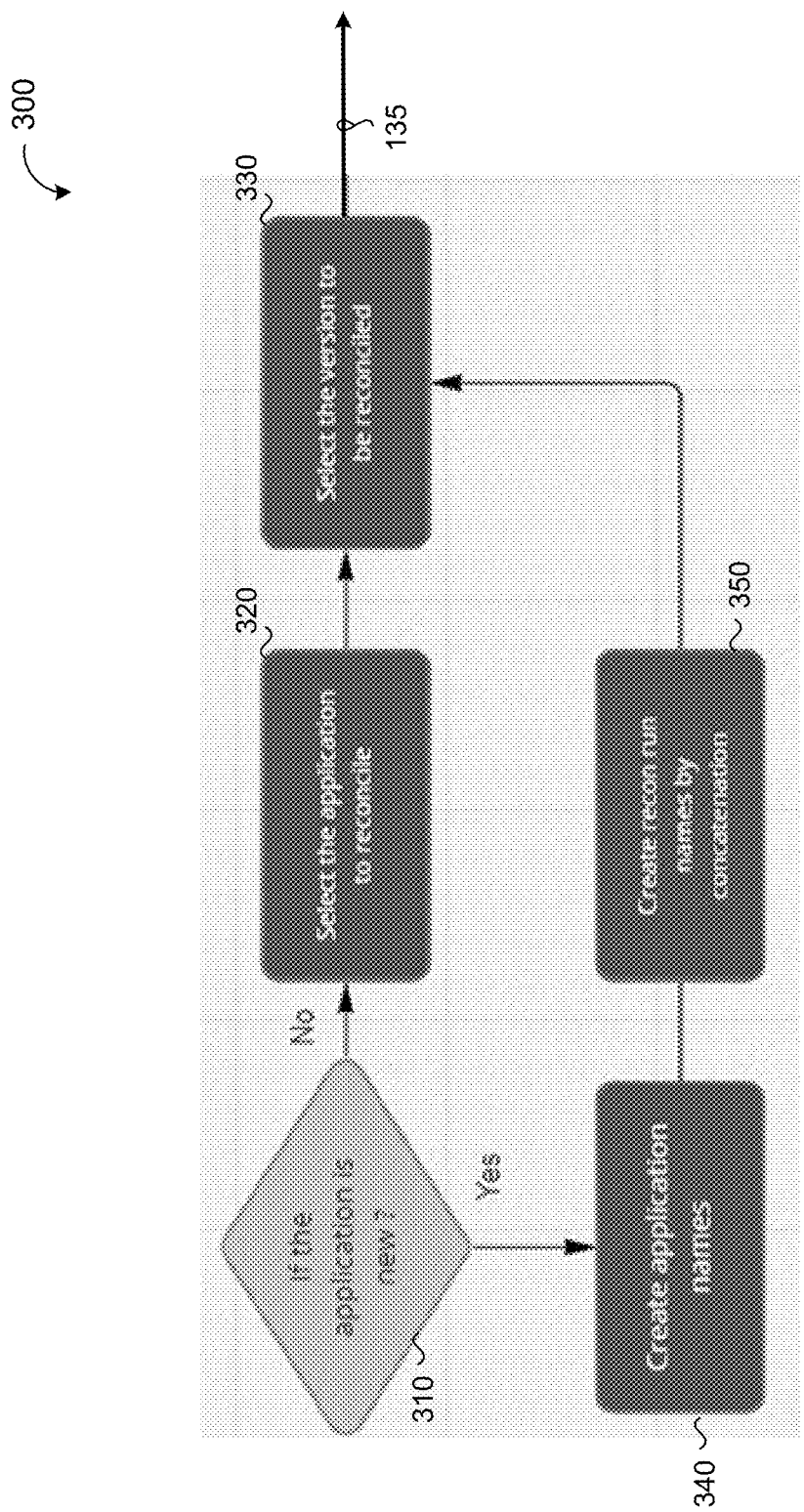
FIG. 3A illustrates a flowchart of exemplary arrangements of operations of a reconciliation label module.

Referring now to FIGS. 3A and 3B, the reconciliation label module 300 is configured to select data sources 135 for reconciliation. That is, an example reconciliation label module 300 (FIG. 3A) first determines, at operation 310, whether the first data source 135a or the second data source 135b corresponds to a new data source based on the reconciliation request 102. Based on determining that neither the first nor second data sources 135a, 135b correspond to a new data source, the reconciliation label module 300 selects the data sources (e.g., applications) 135 to reconcile and selects versions of the selected data sources 135 for reconciliation at operations 320 and 330, respectively. For example, the reconciliation label module 300 may select the first data source 135a and the second data source 135b (and the corresponding data source 135 versions) based on user input included in the reconciliation request 102 (FIG. 1).

On the other hand, based on determining that at least one (or both) of the first or second data sources 135a, 135b corresponds to a new data source, the reconciliation label module 300 creates data source labels and reconciliation execution labels at operations 340 and 350, respectively. Here, the user 10 may include the data source labels and the reconciliation execution labels as part of the reconciliation request 102 (FIG. 1) to the data reconciliation controller 200. For instance, the user 10 may specify that a new data source label is "app1" while the reconciliation execution label is "abc2." After selecting the data sources 135 for reconciliation, the reconciliation label module 300 provides the reconciliation execution label including the data sources 135 and their corresponding versions to the dimension linking module 400.

FIG. 3B illustrates an example GUI view 301 depicting a graphical representation of the reconciliation label module 300. In the example shown, the example GUI view 300b depicts a reconciliation execution label (e.g., run name) 362 for each row of the table. Each reconciliation execution label 362, includes a description 364 (e.g., demo reconciliation run), and a corresponding status 366. The status 366 may indicate which step of the reconciliation process the respective reconciliation is currently at. For instance, the status 366 may indicate a reporting, dimension update, or bridged status. Moreover, the example GUI view 301 may display metadata including, but not limited to, creation data 368 indicating a creating user (e.g., administrator or user) and a creation timestamp, modification data indicating a modifying user (e.g., administrator or user) and a modification timestamp, and an execution timestamp.

Figure 4A:
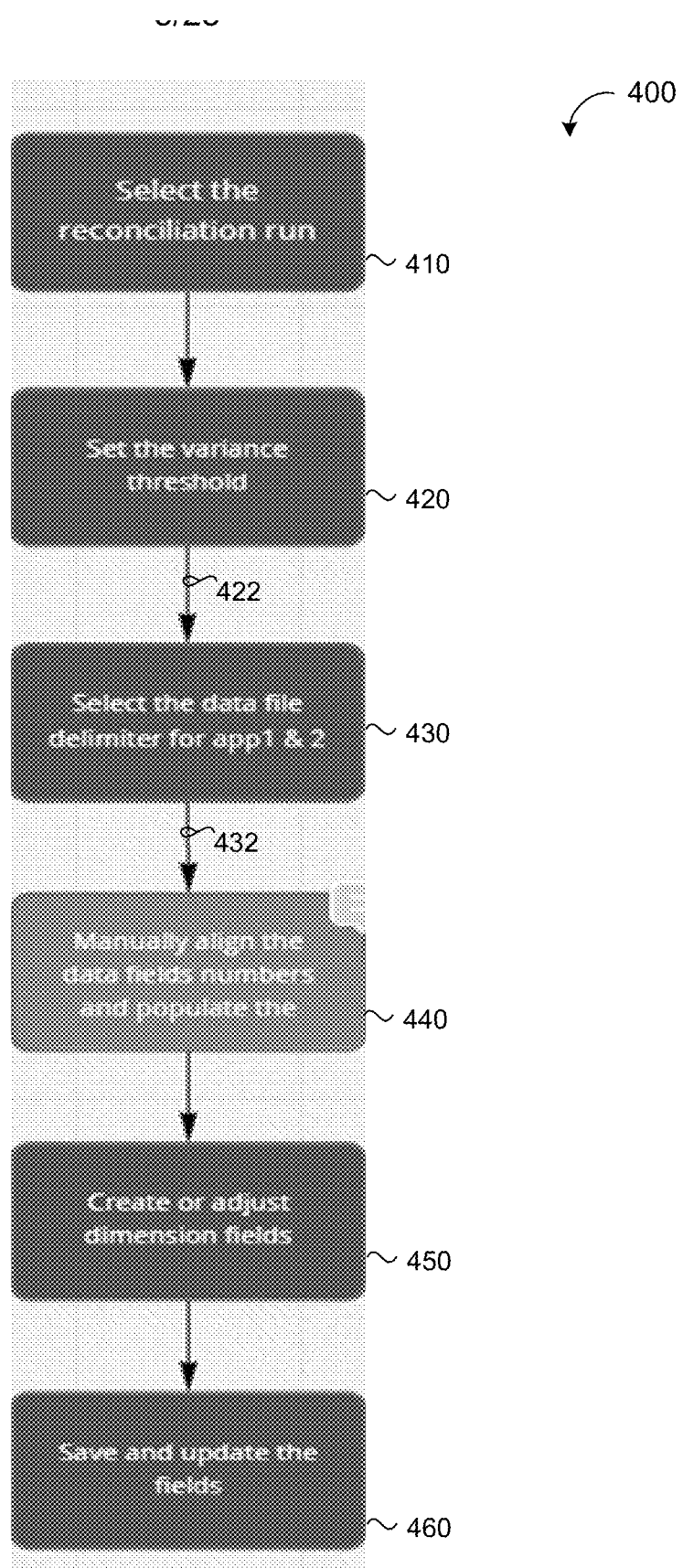
FIG. 4A illustrates a flowchart of exemplary arrangements of operations of a dimension linking module.
Figure 4B:
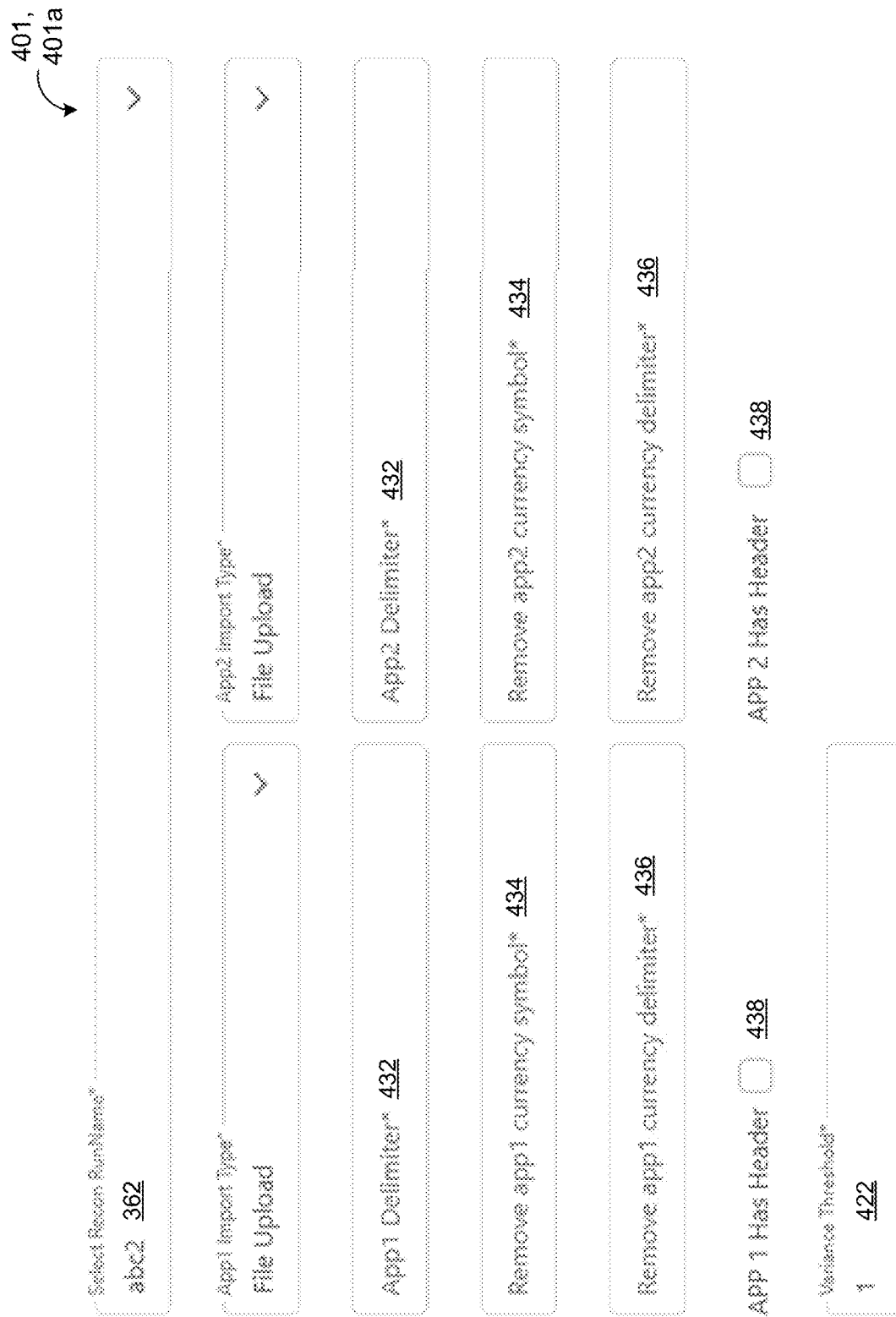

Referring now to FIGS. 4A-4C, the dimension linking module 400 is configured to align dimensions 132 from the data sources 135. An example dimension linking module 400 (FIG. 4A) selects, at operation 410, the reconciliation run for execution. That is, the dimensions linking module 400 selects the reconciliation execution label 362 created by the reconciliation label module 300 (FIG. 3). At operation 420, the dimension linking module 400 sets a variance threshold 422. For example, the data reconciliation controller 200 may receive one or more variance thresholds 422 as part of the reconciliation request 102. The variance threshold 422 determines an amount of margin available when performing data reconciliation.

For instance, when the variance threshold 422 is 0.05, the data reconciliation controller 200 may determine that values within 0.05 of each other are the same or values within 0.05 of zero are treated as a zero value (i.e., variance values under the variance threshold are converted to zeros and do not show any variance within the reconciliation). Simply put, the data reconciliation controller 200 determines that when a difference in values from the first dataset 130a and the second dataset 130b are within the variance threshold 422 no reconciliation of the values is needed. A user may configure the variance threshold 422 to be any value and, unless otherwise configured, the data reconciliation controller 200 may implement a default variance threshold. In some examples, the data reconciliation controller 200 determines the variance threshold 422 based on the data sources 135, the datasets 130, and/or other contextual information.

At operation 430, the dimension linking module 430 selects an execution delimiter 432 for the first data source 135a and the second data source 135b. The execution delimiter 432 may be a semi-colon, colon, hash, or any other character. The execution delimiter 432 of the first and second data sources 135a, 135b may be a same execution delimiter or a different execution delimiter (e.g., first execution delimiter value and second execution delimiter value). In some examples, the data reconciliation controller 200 receives or obtains the execution delimiter 432 from the data reconciliation request 102. In other examples, the data reconciliation controller 200 generates the execution delimiter 432 based on the data sources 135.

The execution delimiter (i.e., "line run rate") determines a maximum number of combinations (e.g., rows or lines of a table) that are processed or refreshed simultaneously. Stated differently, the dimension linking module 400 refreshes the dimension members 134 (e.g., first set of combination dimension members) of the first dataset 130a and the dimension members 134 (e.g., second set of combination dimension members) based on the execution delimiter value. Here, dimension linking module 400 refreshes the dimension members by obtaining an updated dimension member (e.g., updated data value) from the plurality of dimensions members 134 of the first dataset 130a from the first data source 135a and obtains an updated dimension member from the plurality of dimension members 134 of the second dataset 130b from the second data source 135b. Although, in some scenarios, no data updates have occurred in the first and second datasets 130a, 130b and the dimension linking module 400 does perform refreshing because there is no new data to update. As such, the use of dimension members 134 (or set of combination dimension members) herein may either refer to refreshed dimension members or non-refreshed dimension members 134. In some instances, the dimension linking module 400 refreshes the first set of combination dimension members based on a first execution delimiter value and refreshes the second set of combination dimension members based on a second execution delimiter value different than the first execution delimiter value. In some scenarios, processing or refreshing all combinations simultaneously (e.g., thousands or millions of combinations or rows) causes failures (e.g., crashes, freezes, etc.) or other suboptimal behavior.

The execution delimiters 432 may include corresponding locations in the dataset 130 that "split" processing or refreshing of the combinations or rows at the execution delimiter locations into "batches," thereby assuring stable execution. A user may configure the execution delimiter 432 to have any location such that the user may control a batch size for execution. Unless otherwise configured, the data reconciliation controller 200 may implement a default execution delimiter, for example, to have a default batch size. In some implementations, the data reconciliation controller 200 determines the execution delimiter 432 based on the data sources 135, the datasets 130, or other contextual information (e.g., available computational resources). Described in greater detail with reference to FIGS. 4B-4D, the dimension linking module 400 aligns, at operation 440, the dimensions 132 of the first and second data sources 135 and generates (i.e., creates) additional dimensions at operation 450. Thereafter, the dimension linking module 400, at operation 460, saves and outputs the aligned first and second data sources 135a, 135b to the import module 500.

FIGS. 4B-4D illustrate various example GUI views 401 each depicting a graphical representation of the dimension linking module 400. As shown in example GUI view 401, 401a, the user may select the reconciliation execution label 362 for alignment and select a dataset 130 import type. For instance, the first and second datasets 130a, 130b may be imported from their respective data sources 135 by file upload, direct connection, by user input from the reconciliation request, or some combination thereof. Continuing with the example, the user may also select, for each data source 135 (e.g., app1 and app2), the currency delimiter 432, a currency symbol 434 for removal, and/or a removal currency delimiter 436 that the dimension linking module 400 removes from the data source 135. In some implementations, the example GUI view 401a also allows the user to set the variance threshold 422 and indicate whether each data source 135 has a header 438 or no header.

Referring now to FIGS. 4C and 4D, in some implementations the dimension linking module 400 displays (e.g., via GUI 116) alignments between data sources 135. For instance, example GUI view 401, 401b shows alignment data for the first data source (e.g., app1) 135a and example GUI view 401, 401c shows alignment data for the second data source (e.g., app2) 135b. The GUI views 401b, 401c show the alignment data separately, it is understood that the alignment data may be shown adjacently. That is, the GUI views 401b, 401c may be shown side-by-side for simple comparison between the data sources 135.

The alignment data shown by the dimension linking module 400 includes the data source 135 (e.g., app1 or app2), dimensions 132, and an indicator 442 (e.g., yes or no) representing whether the respective dimension 132 is included in the respective data source 135. In the example shown, the dimension 132 corresponding to "Year" is not included in the first and second data sources 135a, 135b, and thus, a top member 446 of the "Year" dimension is shown as "2022." As such, the dimension member 134 for the dimension 132 of "Year" includes only the value "2022" in this example. Moreover, the dimension 132 corresponding to "Amount" is included in the first and second data sources 135a, 135b, and thus, a field 444 of '4' is shown. The field 444 may configure a display position of the respective dimension 132 for reconciliation. That is, the field 444 may align the "Amount" dimension 132 between the data sources 135. In some implementations, the user manually aligns and populates the alignment data or imports additional dimensions 132. In other implementations, the dimension linking module 400 aligns and populates the alignment data based on the data sources 135 without any user input.

Figure 5A:
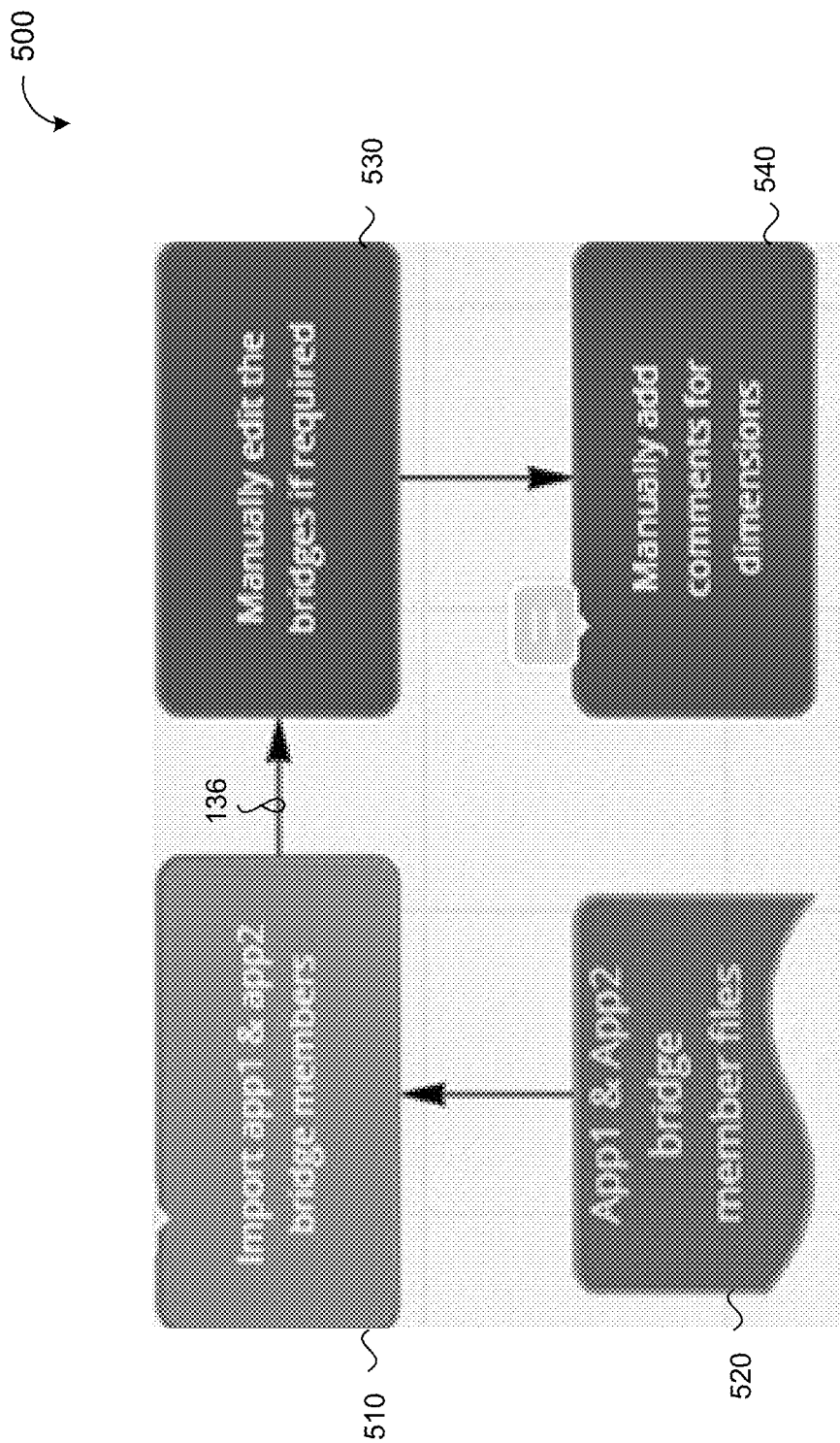
FIG. 5A illustrates a flowchart of exemplary arrangements of operations of an import module.

FIGS. 5A and 5B illustrate the import module 500 configured to bridge alignment data from the data sources 135. In particular, an example import module 500 (FIG. 5A) receives the data sources 135 (e.g., aligned data sources) from the dimension linking module 400 and generates, at operation 510, a corresponding bridge member 136 for each dimension 132 of the respective dataset 130. Bridge members 136 link the datasets 130 together for reconciliation purposes. In some implementations, the data reconciliation controller 200 generates a new data structure or table (FIG. 5B) that includes a first set of combination dimension members of the first dataset 130a and a second set of combination dimension members of the second dataset 130b.

That is, for each dataset 130, the data reconciliation controller 200 generates every combination (i.e., pair) of input dimension members 134. For example, when a dataset 130 includes five dimensions 132, with a first dimension 132 having 40 dimension members 134, a second dimension 132 having 35 dimension members 134, a third dimension 132 having 3 dimension members 134, a fourth dimension 132 having 10 dimension members 134, and a fifth dimension 132 having 32 dimension members 134, the data reconciliation controller 200 generates 1,344,000 combinations for the dataset 130 (i.e., 40*35*3*10*32=1,344,000). Accordingly, the data reconciliation controller 200 generates a first set of combination dimension members (e.g., dimension members) 134 using each pair of dimension members 134 of the one or more dimensions 132 of the first dataset 130a and generates a second set of combination dimension members (e.g., dimension members) 134 using each pair of dimension members 134 of the one or more dimensions of the second dataset 130b. Thereafter, the data reconciliation controller 200 adds the bridge members 136 in connection with each combination dimension member 134 of the new data structure. That is, the data reconciliation controller 200 may place the respective bridge member 136 in association with each corresponding combination dimension member 134 of the new data structure.

After generating the combination dimension members and generating the data structures including the combinations and bridge members, the data reconciliation controller 200 refreshes or updates each set of combinations at a rate governed by the execution delimiter. The data reconciliation controller 200 repeats this process for each dataset 130 from each data source 135 (i.e., each application) and continues to split up refreshes (based on the execution delimiter) for larger datasets 130. After the data has been refreshed at least once, the data reconciliation controller 200 may determine whether any of the data in the datasets 130 have changed prior to re-refreshing or updating the data. That is, the data reconciliation controller 200, in some examples, only updates or refreshes data when a change in the data is detected (i.e., a change in the datasets 130).

In some implementations, the data reconciliation controller 200 generates a suppressed values data structure (e.g., a table) that includes two or more tables that include all the data without suppressed data such as cells (i.e., column and row combinations) that are zero and/or no data (i.e., unadjusted suppressed values). In some examples, cells zeroed by the variance threshold are removed. As discussed above, the data reconciliation controller 200 may only generate the suppressed values data structure when a change has been detected in the data since the last execution of the data reconciliation controller 200.

In some implementations, after generation of the suppressed values data structure, the data reconciliation controller 200 combines the two tables of the suppressed values data structure into a linear format. Next, the data reconciliation controller 200 may combine the adjustment data into a linear format. Next, the data reconciliation controller 200 or tool may combine some or all of the previously generated tables (i.e., the tables of the combinations and bridge members and the adjusted data tables into an all data table (i.e., in a linear format). The data reconciliation controller 200, when generating the all data table, may inverse each quantity for the combinations from the second dataset 200b (e.g., the value 100 becomes −100 and the value 14 becomes −14, etc.).

In some examples, the bridge members link dimensions 132 together in a one-to-one manner. For instance, when the first data source 135a has a dimension 132 titled "Accounts" and the second data source 135b has a dimension 132 titled "Accts" that maps to the dimension members 134 (e.g., data) in the Accounts dimension 132 of the first data source 135a, the bridge member between Accounts and Accts is a one-to-one relationship. In other examples, the bridge members link dimensions 132 together in a many-to-one, a one-to-many, and/or a many-to-many relationship for the data sources 135. For example, when the first data source 135a has a dimension titled "Accounts" and the second data source 122b has two dimensions titled "Accts1" and "Accts2" that splits the dimension members 134 into two separate dimensions 132, the bridge member may bridge "Accounts" to both "Accts1" and "Accts2," forming a one-to-many relationship between the first data source 135a and the second data source 135b. As such, the dimensions 132 may be divided in any number of ways between the data sources 135, and the bridge members may be used to properly map the dimension members 134 from the first data source 135a to the second data source 135b.

In some scenarios, the import module 500 previously generated the bridge members 136 for a respective data source 135 whereby the import module 500, at operation 520, imports the previously generated bridge members 136 rather than generating the bridge members again. At operation 530, the user may manually edit any of the bridge members 136 generated by the import module 500. Moreover, the user may add comments, at operation 540, for dimensions 132 or bridge members 136 such as an exception to one or more general rules.

FIG. 5B illustrates an example GUI view 501 depicting a graphical representation displayed by the import module 500. As shown, the graphical representation depicts the plurality of bridge members 136, 136a—e generated by the import module 500 for the first and second data sources 135a, 135b. Here, each bridge member 136 is in association with the first combination of dimension member 134 and/or the second combination dimension member 134. In particular, the example shows a first bridge member 136a between the first and second application 135a, 135b and a second and third bridge member 136b, 136c between the "Year" and "Period" dimensions 132 of the data sources 135. Moreover, the example shows a fourth bridge member 136d between an "Account" dimension 132 of the first data source 135a that corresponds to an "Acct" dimension of the second data source 135b and a fifth bridge member 136e between an "Entity" dimension 132 of the first data source 135a that corresponds to an "Ent" dimension 132 of the second data source 135b. Below each bridge member 136 is a combination dimension member 134 corresponding to the bridge member 136.

Figure 6A:
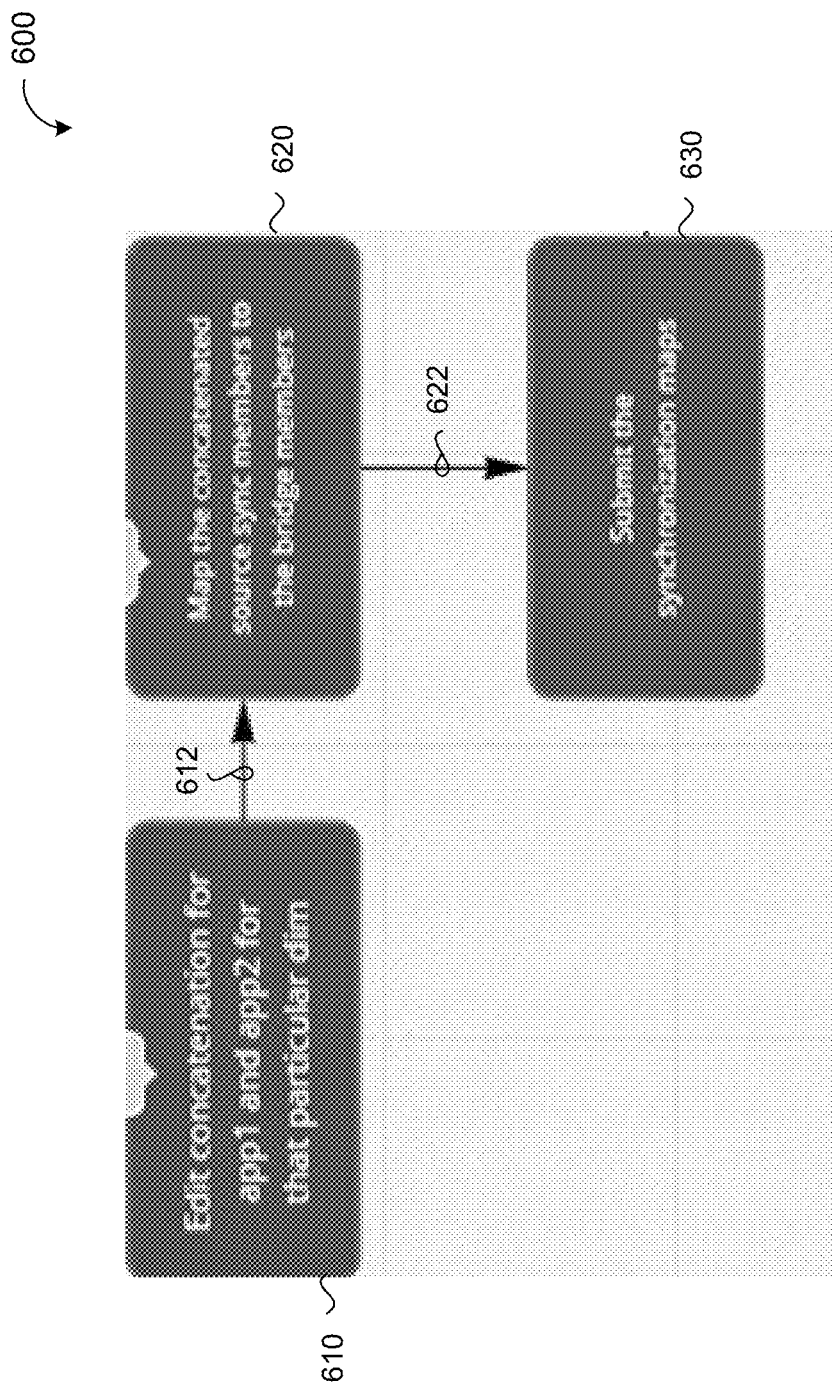
FIG. 6A illustrates a flowchart of exemplary arrangements of operations of a bridging module.

Referring now to FIGS. 6A-6C, in some implementations, the bridging module 600 is configured to synchronize source members and bridge members 136. An example bridging module 600 (FIG. 6A) generates, at operation 610, a concatenation 612 of the bridging member 136 and a dimension member 134 (e.g., one of the combination dimension members) for each respective dimension 132. As such, the bridging module 600 may import the bridge members 136 generated by the import module 500 (FIG. 5) for each data source 135 and generate the concatenation 612 using the bridging members 136 and the corresponding dimension members 134. Simply put, the bridging members 136 link dimensions between the data sources 135 and the concatenation 612 associates dimension members 134 (e.g., data values) of the dimension 132 for bridging member 136. After, generating the concatenations, the user may edit/configure any of the generated concatenations. Using the final concatenations 612, the bridging module 600, at operation 620, generates a synchronization map 622 that maps the source members (e.g., dimension members 134) to the bridge members 136 and submits the synchronization maps 622 at operation 630.

FIGS. 6B and 6C, illustrate the bridging module 600 displaying (e.g., via GUI 116) a representation corresponding to the synchronization map 622. For instance, example GUI view 601, 601a shows an example synchronization map for the first data source (e.g., app1) 135a and example GUI view 601, 601b shows an example synchronization map for the second data source (e.g., app2) 135b. The synchronization map includes the dimensions 132, dimension members 134, an inverse operation indicator 602, and bridge members 136. Here, each row corresponds to a concatenation 612 generated by the bridging module 600. For example, the synchronization map 622 for the first data source 135a (FIG. 6B) shows the "Period" dimension 132 having a dimension member 134 (e.g., data value) of "600" and a bridge member 136 of "EXP" with the inverse operation indicator 602 indicating "NO." Thus, the data reconciliation controller 200 will not perform an inverse operation for the "Period" dimension based on the inverse operation indicator 602. Alternatively, in a scenario where the inverse operation indicator 602 indicates "YES," the data reconciliation controller 200 performs the inverse operation for the "Period" dimension.

Figure 7A:
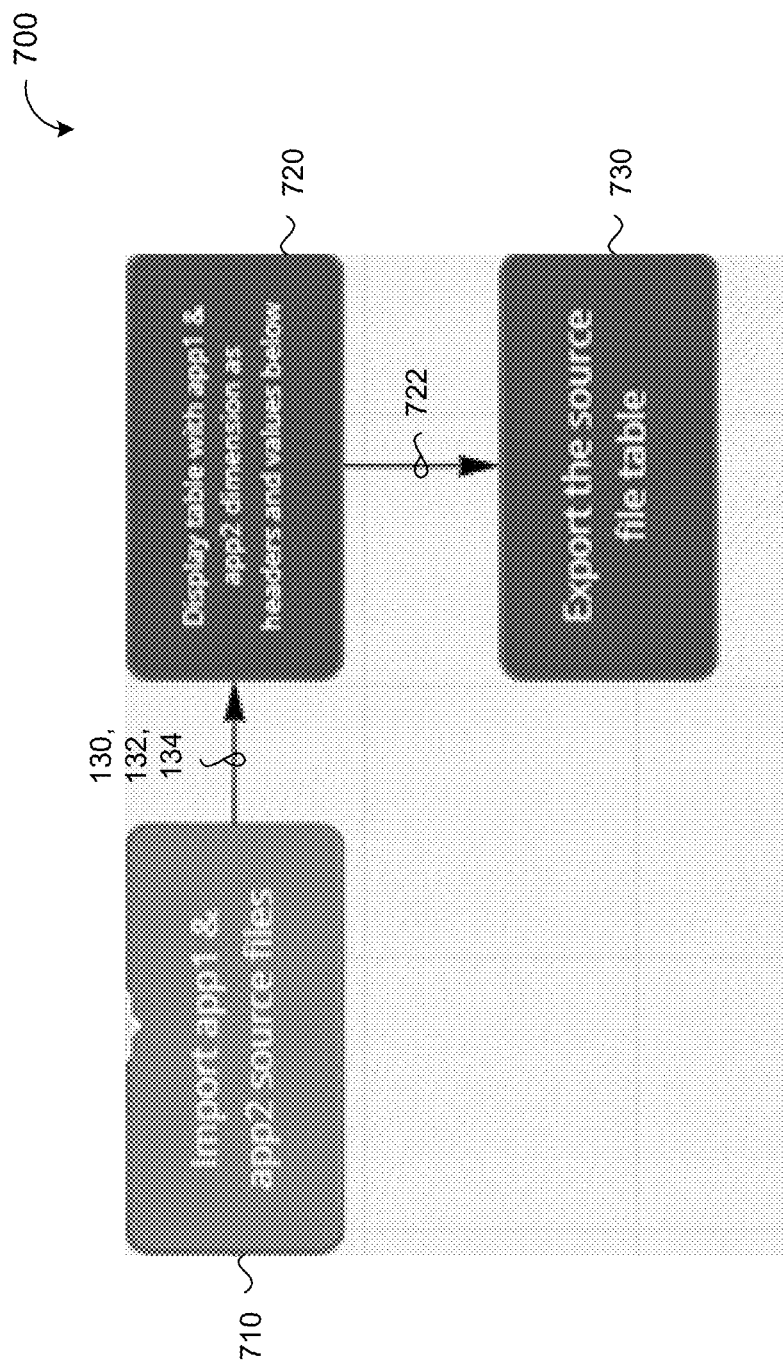
FIG. 7A illustrates a flowchart of exemplary arrangements of operations of a bridge execution module.

FIGS. 7A and 7B illustrate the bridge execution module 700 configured to generate a source file table 722 displaying the dimensions 132 of the first and second data sources 135a, 135b as headers with corresponding values below. In particular, an example bridge execution module 700 (FIG. 7A) imports, at operation 710, the first and second datasets 130a, 130b from the first and second data sources 135a, 135b, respectively. Each dataset 130 includes one or more dimensions 132 and each dimension 132 includes a plurality of dimension members 134 (e.g., data values). At operation 720, the bridge execution module 700 generates the source file table 722 using the first and second datasets 130a, 130b and the data synchronization maps 622. Thereafter, the bridge execution module 700 exports the source file table 722 at operation 730.

When the data reconciliation controller 200 imports the datasets 130 the data reconciliation controller 200 generates a bridge member 136 for each dimension member (e.g., for every dimension member in the combination of dimension members). However, if the bridge execution module 700 detects that one or more of the dimension members 134 do not include a bridge member 136, a bridge kickout occurs indicating the missing bridge member. Responsive to the bridge kickout, the data reconciliation controller 200 and/or the user may update the bridge members (e.g., via the bridging module 600).

FIG. 7B illustrates an example GUI view 701 depicting a graphical representation of the source file table 722 generated by the bridge execution module 700. In the example shown, the source file table 722 includes the data sources 135 (e.g., app1 and app2), the "Year" dimension 132 next to the bridging member 136 for the "Year" dimension 132, and the "Account" or "Acct" dimension next to the bridging member for the account dimension 132.

Figure 8A:
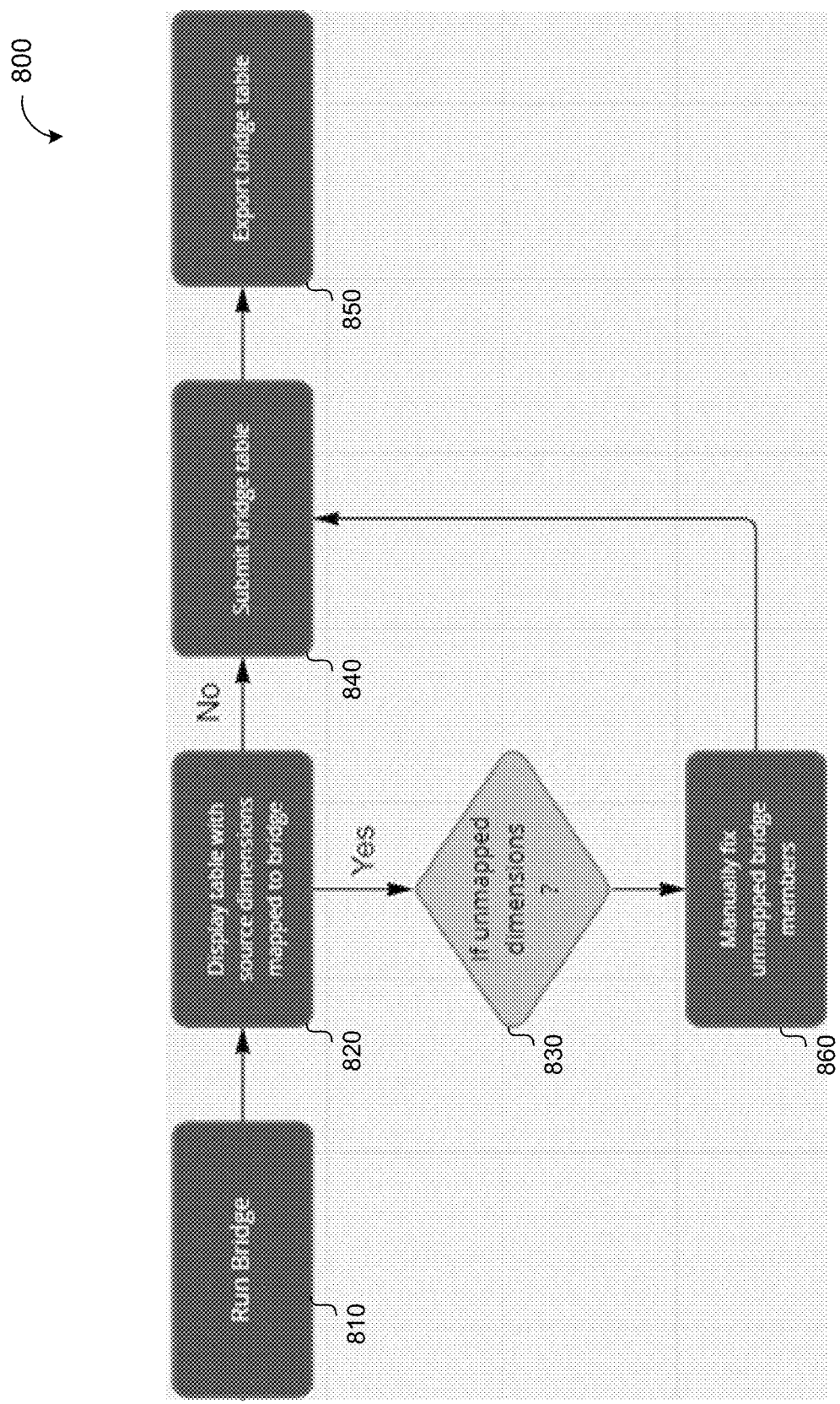
FIG. 8A illustrates a flowchart of exemplary arrangements of operations of a transformation identifier.

Referring now to FIGS. 8A and 8B, in some examples, the transformation identifier 800 is configured to identify required transformations for the source file table 722 (e.g., generated by the bridge execution module 700) before reconciliation execution. In some implementations, one or more of the data sources 135 (e.g., the second data source 135b) have a dimension 132 that does not directly map (i.e., via the bridge members 136) to any corresponding dimension 132 of the other data source 135 (e.g., the first data source 135a). For example, in some scenarios the second data source 135b performs additional processing on dimension members 134 of a dimension 132 from the first data source 135a thereby generating a new dimension 132 that is not present in the first data source 135a. In this scenario, there is no direct mapping (e.g., no bridge member 136) for the new dimension 132 of the second data source 135b because the first data source 135a has no corresponding dimension 132. Thus, the reconciliation controller 200 may generate an additional table to concatenate any number of columns to perform additional multi-dimensional mapping in situations where a dimension 132 does not exist in one data source 135 but is present in the other data source 135.

In the example shown, at operation 810, the transformation identifier 800 executes the source file table 722 to generate the bridge table. The bridge table identifies any transformations and displays the executed source file table at operation 820. Here, identified transformations may indicate that one or more of the dimensions 132 and/or the bridge members 136 are unmapped. At operation 830, the transformation identifier 800 determines whether the source file table has any unmapped dimensions 132 or missing dimensions. Based on determining that there are not any unmapped dimensions 132 (or bridge members 136), the transformation identifier 800 submits and exports the table at operations 840 and 850, respectively. Here, data reconciliation controller 200 may input a field number from the source file and enable the status as active.

On the other hand, based on determining that there are one or more unmapped dimensions 132 or missing dimensions 132, the transformation identifier 800 updates the one or more unmapped dimensions at operation 860. For instance, the data reconciliation controller 200 may prompt the user to manually update the unmapped dimensions. Alternatively, the data reconciliation controller 200 may update the unmapped dimensions or missing dimension directly, for example, entering a place holder value for the missing dimension. Moreover, if there is a missing source member the data reconciliation controller may enter a top member value for the missing value (e.g., 2022 for missing dimension 132 of "Year"). After correcting the unmapped dimensions, transformation identifier 800 submits and exports the bridge table at operations 840 and 850.

FIG. 8B illustrates an example GUI view 801 depicting a graphical representation of the executed source file table generated by the transformation identifier 800. Here, the executed source file table shows the dimensions 132 and concatenations 612 for each of the first and second data sources 135a, 135b. In the example shown, each dimension 132 of the data sources 135 is mapped to a corresponding dimension in the other of the data sources 135. That is, in this example there are no unmapped dimensions 132. However, if there were any unmapped dimensions 132 the executed source file table would display the unmapped dimensions 132 for correction. In particular, the data reconciliation controller 200 may re-execute using updated data to map the unmapped dimension 132 or the user may manually map the unmapped dimension 132.

Figure 9A:
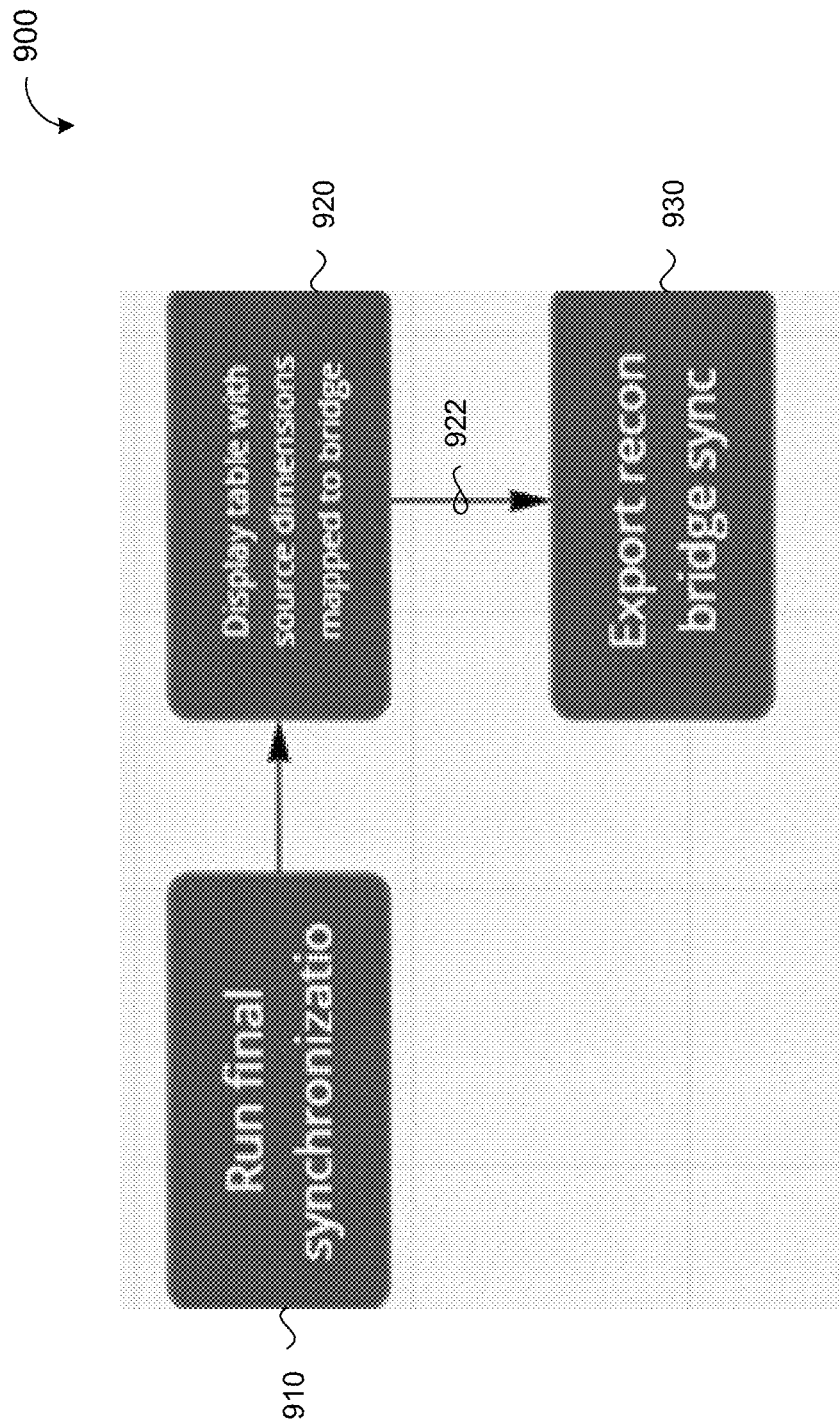
FIG. 9A illustrates a flowchart of exemplary arrangements of operations of a transformation execution module.

FIGS. 9A and 9B illustrate the transformation execution module 900 configured to generate a bridge synchronized table 922 displaying the dimensions 132 of the first and second data sources 135a, 135b as headers with corresponding values below. In particular, an example transformation execution module 900 (FIG. 9A) receives the bridge table generated by the transformation identifier 800 at operation 910. Using the bridge table, the transformation execution module 900 generates the bridge synchronized table 922 at operation 920 and exports the bridge synchronized table at operation 930. Notably, operation 920 is similar to operation 720 (FIG. 7) with the only difference being that, at operation 920, the transformation execution module 900 uses the bridge table with the transformations. Simply put, operation 720 (FIG. 7) executes before any transformations (e.g., unmapped dimensions) were corrected and operation 920 executes using the bridge table that includes any updates to correct the unmapped dimensions.

FIG. 9B illustrates an example GUI view 901 depicting a graphical representation of the bridge synchronization table 922 generated by the bridge execution module transformation execution module 900. In the example shown, the bridge synchronization table 922 includes the data sources 135 (e.g., app1 and app2), the "Year" dimension 132 next to the bridging member 136 for the "Year" dimension 132, and the "Account" or "Acct" dimension next to the bridging member for the account dimension 132. Notably, in this example there were no transformations (e.g., from FIG. 8B), and thus, the bridge synchronization table 922 is similar (or identical) to the source file table 722 shown in FIG. 7B.

Figure 10A:
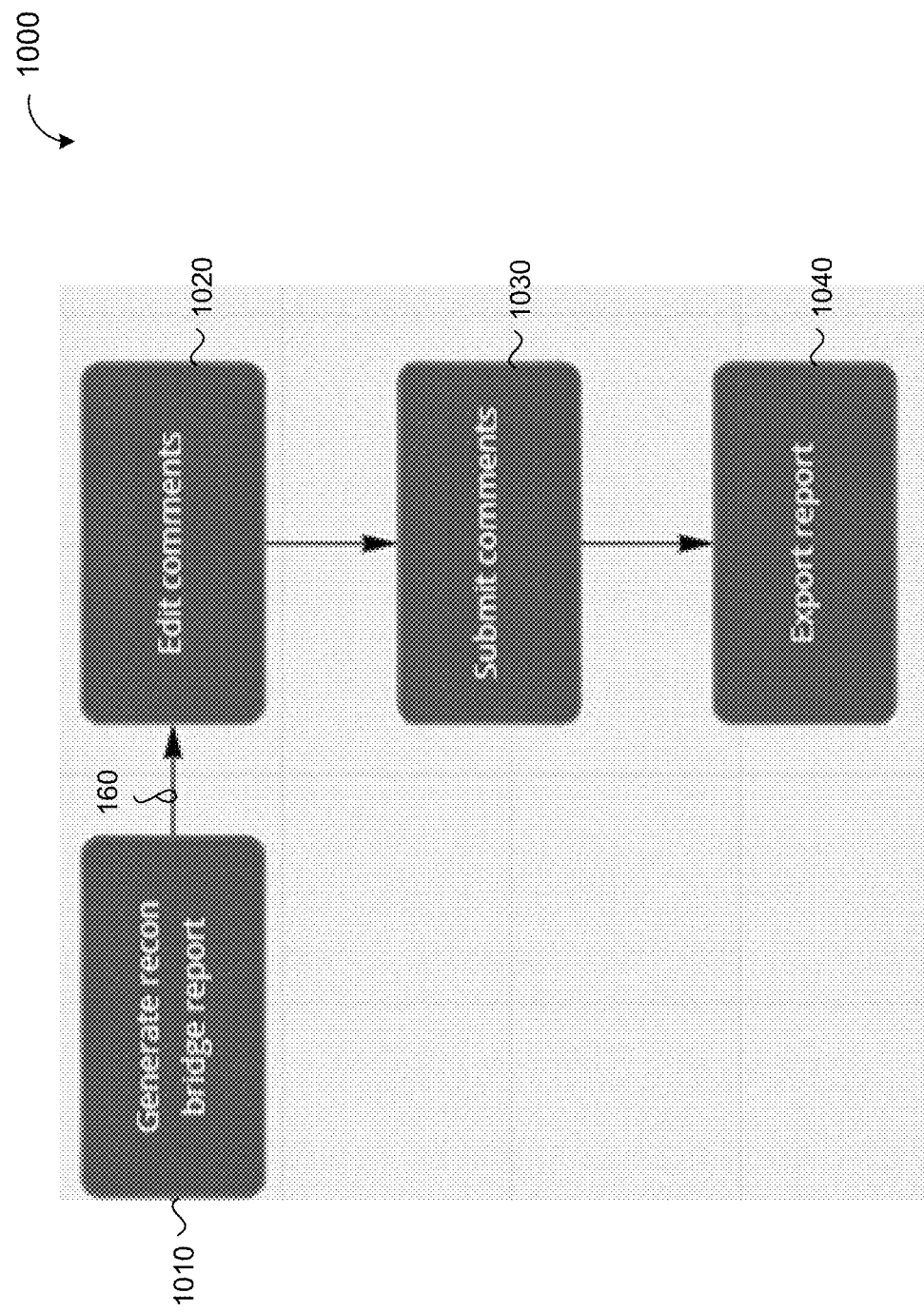
FIG. 10A illustrates a flowchart of exemplary arrangements of operations of a report execution module.

Referring now to FIGS. 10A and 10B, in some implementations, the report execution module 1000 is configured to a reconciliation report 160. That is, using the all data table (e.g., bridge synchronization table 922), the data reconciliation controller 200 generates one or more reconciliation reports 160, such as a reconciliation bridge report. The report visually provides the reconciliation results to, for example, a user. For example, the report highlights or annotates data discrepancies between the first dataset 130a from the first data source 135a and the second dataset 130b from the second dataset 130b. In some implementations, the data reconciliation controller 200 generates additional dimensional conversions (i.e., the data reconciliation controller 200 generates another opportunity to change or adjust bridge account data based on concatenation of existing dimensions to allow for reconciliations where a single dimension in one application gets split out into multiple dimensions in another application).

In particular, the report execution module 1000 generates the reconciliation report 160 at operation 1010. Optionally, the user may edit and/or submit commits for the reconciliation report 160 at operations 1020 and 1030, respectively.

Thereafter, the report execution module 1000 exports the reconciliation report 160 at operation 1040. For instance, the report execution module 1000 may export the reconciliation report 160 to the user device 110 associated with the reconciliation request 102 that initiated the reconciliation of the datasets 130. In response to receiving the reconciliation report 160, the user device 110 may display (e.g., via the GUI 116) the reconciliation report 160 to the user.

FIG. 10B illustrates an example GUI view 1001 depicting a graphical representation of the reconciliation report 106 generated by the report execution module 1000. In the example shown, the reconciliation report 160 includes one or more bridge members 136, comments 1004, and a reconciliation value 1002. In particular, the reconciliation report shows a first bridge member 136 between the "Account" and "Acct" dimension 132 of the first and second data sources 135a, 135b and a second bridge member between the "Entity" and "Ent" dimension 132 of the first and second data sources 135a, 135b. Any comments 1004 input by the user during the reconciliation process are displayed in connection with the reconciliation report to notify the user of any special circumstances with a particular reconciliation occurrence. The reconciliation values 1002 graphically display to the user whether any reconciliation between the datasets 130 needs to occur. Simply put, the reconciliation values 1002 indicate whether any data is different, missing, etc. between the datasets 130 from the data sources 135.

In some implementations, after generation of the suppressed values data structure, the data reconciliation controller 200 combines the two tables of the suppressed values data structure into a linear format. Next, the data reconciliation controller 200 may combine the adjustment data into a linear format. Next, the data reconciliation controller 200 may combine some or all of the previously generated tables (i.e., the tables of the combinations and bridge members and the adjusted data tables into an all data table (i.e., in a linear format). The data reconciliation controller 200, when generating the all data table, may inverse each quantity for the combinations from the second dataset 200b (e.g., the value 100 becomes −100 and the value 14 becomes −14, etc.).

Figure 11:
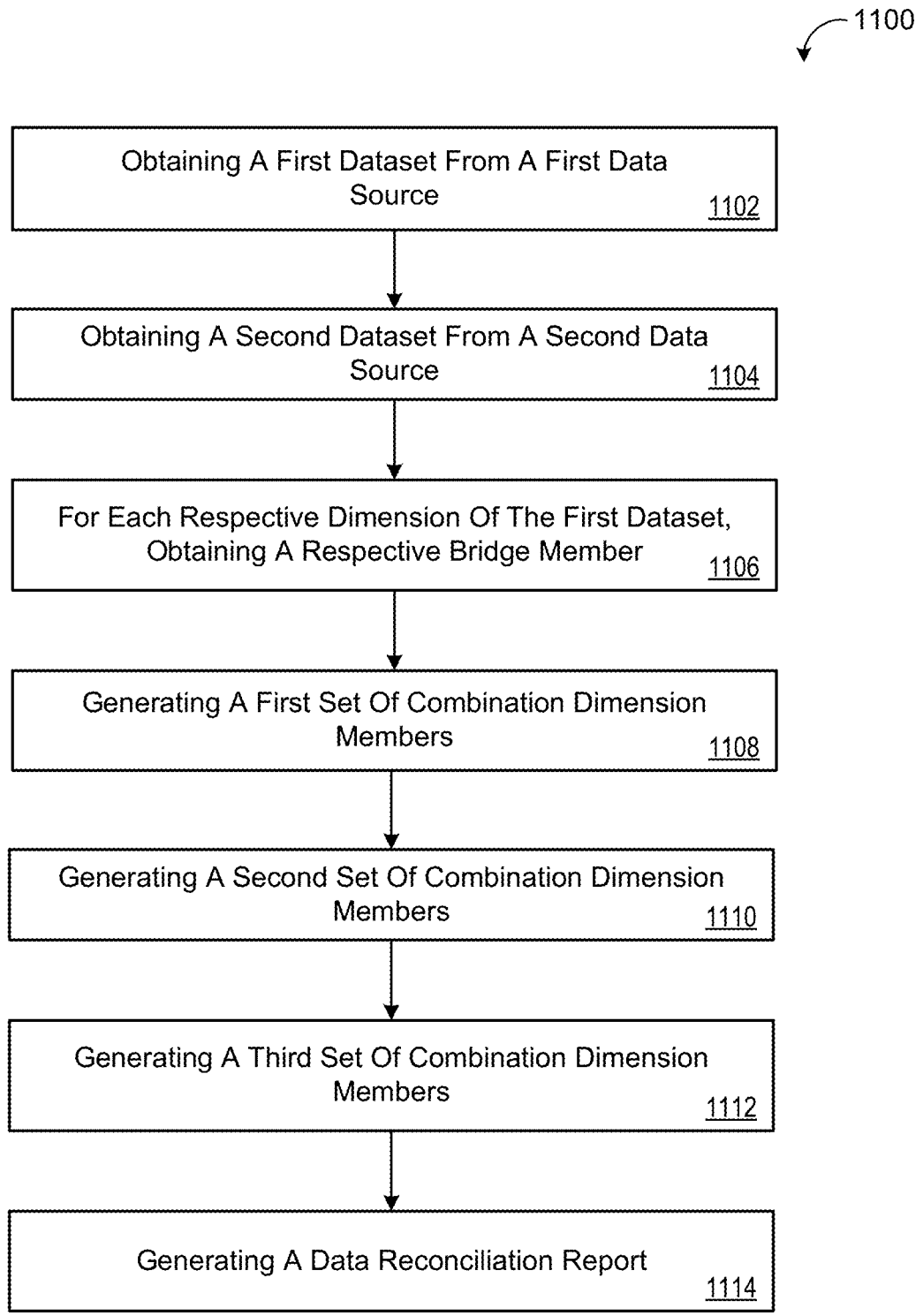
FIG. 11 is a flowchart of an example arrangement of operations for a method of performing data reconciliation.

FIG. 11 is a flowchart of an exemplary arrangement of operations for a method 1100 of performing data reconciliation. The method 1100 may be performed, for example, by the data reconciliation controller 200 operating at the processing system 140. At operation 1102, the method 1100 includes obtaining a first dataset 130a from a first data source 135a. The first dataset 130a includes one or more dimensions 132 each dimension 132 having a plurality of dimension members 134 (e.g., data values). At operation 1104, the method 1100 includes obtaining a second dataset 130b from a second data source 135b. Similarly, the second dataset 130b also includes one or more dimensions 132 each dimension 132 having a plurality of dimension members 134. Obtaining the first and second datasets 130a, 130b may be in response to receiving, from a user device 110 in communication with the data processing hardware 142 (e.g., in communication via the network 120), a data reconciliation request 102 requesting data reconciliation for a first dataset 130a and a second dataset 130b. The data reconciliation request 102 may be sent by a user 10 associated with the user device 110 or in response to a trigger event.

For each respective dimension 132 of the first dataset 130a, the method 1100, at operation 1106, includes obtaining and/or generating a respective bridge member 136. The respective bridge member 136 associates the respective dimension 132 of the first dataset 130a with a respective dimension 132 of the second dataset 130b. For instance, the a respective bridge member 136 may associate a dimension 132 of "Entity" of the first dataset 130a with a corresponding dimension 132 of "Ent" of the second dataset. The bridge member 136 between these two dimensions 132 indicates to the data reconciliation controller 200 to perform reconciliation between the data value (e.g., dimension members 134) of these two dimensions 132. As such, each dimension member 134 included in these two dimensions 132 may be associated with the respective bridge member 136.

At operation 1108, the method 1100 includes generating a first set of combination dimension members 134 using each pair of dimension members 134 of the one or more dimensions 132 of the first dataset 130a and the respective bridge members 136. Similarly, at operation 1110, the method 1100 includes generating a second set of combination dimension members 134 using each pair of dimension members 134 of the one or more dimensions 132 of the second dataset 130b and the respective bridge members 136. For example, generating a set of combination dimension members 134 for a dataset 130 that includes five dimensions 132, with a first dimension having 40 members, a second dimension having 35 members, a third dimension having 3 members, a fourth dimension having 10 members, and a fifth dimension having 32 members, the data reconciliation controller 200 generates 1,344,000 combinations (e.g., lines) for the dataset 130 (i.e., 40*35*3*10*32=1,344,000). Simply put, the set of combination dimension members 134 represents every combination of dimension members 134 from the dimensions 132 of the dataset 130.

Optionally, the method 1100 may further include refreshing the first set of combination dimension members and the second set of combination dimension members based on an execution delimiter value corresponding to a quantity of dimension members refreshed simultaneously Advantageously, the execution delimiter value splits the rows into "batches" thereby assuring stable execution. Thus, when the method 1100 refreshes the first and second combination dimension members the method uses the refreshed first and second combination dimension members. On the other hand, when no refreshing occurs the method simply uses the first and second combination dimension members.

At operation 1112, the method 1100 includes generating a third set of combination dimension members using the first set of combination dimension members 134 and the second set of combination dimension members 134. Here, the third set of combination dimension members correlates the dimension members 134 between the first and second datasets 130a, 130b. For instance, the third set of combination dimension members may correspond to the all data table (e.g., either the source file table 722 (FIG. 7) or bridge synchronized table 922 (FIG. 9)). Thereafter, at operation 1114, the method 1100 includes generating a data reconciliation report 160 from the third set of combination dimension members (e.g., the source file table 722 (FIG. 7) or the bridge synchronized table 922 (FIG. 9)). For example, when no transformations of the datasets 130 are required, the data reconciliation controller 200 generates the data reconciliation report 160 using the source file table 722. Otherwise, where transformations are required for the datasets 130, the data reconciliation controller 200 generates the reconciliation report using the bridge synchronized table 922. Notably, the reconciliation report reconciles data between the first and second datasets 130a, 130b whereby the data reconciliation controller 200 detects whether any data has been modified, added, or deleted between the first and second datasets 130a, 130b.

Figure 12:
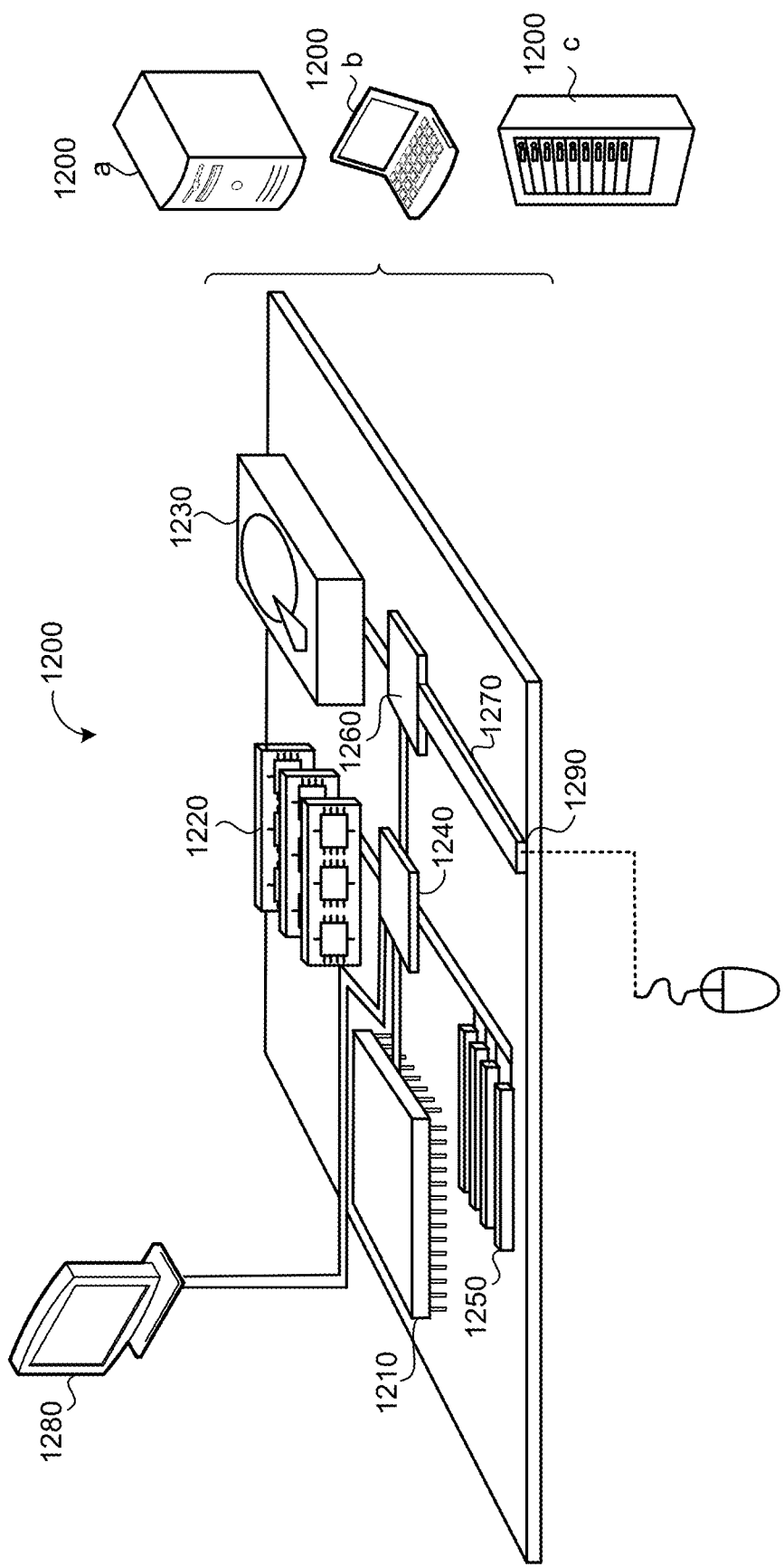
FIG. 12 is a schematic view of an example computing device that may be used to implement the systems and methods described herein.

FIG. 12 is a schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to a low speed bus 1270 and a storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and a low-speed expansion port 1290. The low-speed expansion port 1290, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving, from a user device in communication with the data processing hardware, a data reconciliation request requesting data reconciliation for a first dataset and a second dataset;
   obtaining the first dataset from a first data source, the first dataset comprising one or more dimensions, each dimension of the one or more dimensions of the first dataset comprising a first plurality of dimension members;
   obtaining the second dataset from a second data source, the second dataset comprising one or more dimensions, each dimension of the one or more dimensions of the second dataset comprising a second plurality of dimension members;
   for each respective dimension of the first dataset, obtaining a respective bridge member, the respective bridge member associating the respective dimension of the first dataset with a respective dimension of the second dataset;
   generating, using each pair of dimension members of the one or more dimensions of the first dataset and the respective bridge members, a first set of combination dimension members;
   generating, using each pair of dimension members of the one or more dimensions of the second dataset and the respective bridge members, a second set of combination dimension members;
   refreshing the first set of combination dimension members and the second set of combination dimension members based on an execution delimiter value corresponding to a quantity of dimension members refreshed simultaneously;
   generating, using the refreshed first set of combination dimension members and the refreshed second set of combination dimension members, a third set of combination dimension members; and
   generating, from the third set of combination dimension members, a data reconciliation report.

2. The method of claim 1, wherein refreshing the first set of combination dimension members and the second set of combination dimension members based on the execution delimiter value further comprises:
   refreshing the first set of combination dimension members based on a first execution delimiter value; and
   refreshing the second set of combination dimension members based on a second execution delimiter value.

3. The method of claim 1, wherein refreshing the first set of combination dimension members and the second set of combination dimension members based on the execution delimiter value further comprises:
   obtaining an updated dimension member from the first plurality of dimension members of the first dataset from the first data source; and
   obtaining an updated dimension member from the second plurality of dimension members of the second dataset from the second data source.

4. The method of claim 1, wherein generating the third set of combination dimension members using the refreshed first set of combination dimension members and the refreshed second set of combination dimension members comprises suppressing a portion of the combination dimension members.

5. The method of claim 4, wherein the portion of the combination dimension members comprises combination dimension members associated with a zero or no data.

6. The method of claim 4, wherein suppressing the portion of the combination dimension members comprises zeroing, based on a variance threshold, a second portion of the combination dimension members.

7. The method of claim 1, wherein generating the third set of combination dimension members using the refreshed first set of combination dimension members and the refreshed second set of combination dimension members comprises inversing values associated with the refreshed second set of combination dimension members.

8. The method of claim 1, wherein generating the third set of combination dimension members using the refreshed first set of combination dimension members and the refreshed second set of combination dimension members comprises combining the refreshed first set of combination dimension members and the refreshed second set of dimension members into a linear format.

9. The method of claim 1, wherein the first dataset and the second dataset each comprise numerical values.

10. The method of claim 1, wherein the operations further comprise sending the data reconciliation report to the user device, wherein receiving the data reconciliation report causes the user device to display the data reconciliation report via a graphical user interface.

11. A system comprising:
data processing hardware; and
memory hardware in communication with the data processing hardware, the memory hardware storing instructions that when executed on the data processing hardware cause the data processing hardware to perform operations comprising:
receiving, from a user device in communication with the data processing hardware, a data reconciliation request requesting data reconciliation for a first dataset and a second dataset;
obtaining the first dataset from a first data source, the first dataset comprising one or more dimensions, each dimension of the one or more dimensions of the first dataset comprising a first plurality of dimension members;
obtaining the second dataset from a second data source, the second dataset comprising one or more dimensions, each dimension of the one or more dimensions of the second dataset comprising a second plurality of dimension members;
for each respective dimension of the first dataset, obtaining a respective bridge member, the respective bridge member associating the respective dimension of the first dataset with a respective dimension of the second dataset;
generating, using each pair of dimension members of the one or more dimensions of the first dataset and the respective bridge members, a first set of combination dimension members;
generating, using each pair of dimension members of the one or more dimensions of the second dataset and the respective bridge members, a second set of combination dimension members;
refreshing the first set of combination dimension members and the second set of combination dimension members based on an execution delimiter value corresponding to a quantity of dimension members refreshed simultaneously;
generating, using the refreshed first set of combination dimension members and the refreshed second set of combination dimension members, a third set of combination dimension members; and
generating, from the third set of combination dimension members, a data reconciliation report.

12. The system of claim 11, wherein refreshing the first set of combination dimension members and the second set of combination dimension members based on the execution delimiter value further comprises:
refreshing the first set of combination dimension members based on a first execution delimiter value; and
refreshing the second set of combination dimension members based on a second execution delimiter value.

13. The system of claim 11, wherein refreshing the first set of combination dimension members and the second set of combination dimension members based on the execution delimiter value further comprises:
obtaining an updated dimension member from the first plurality of dimension members of the first dataset from the first data source; and
obtaining an updated dimension member from the second plurality of dimension members of the second dataset from the second data source.

14. The system of claim 11, wherein generating the third set of combination dimension members using the refreshed first set of combination dimension members and the refreshed second set of combination dimension members comprises suppressing a portion of the combination dimension members.

15. The system of claim 14, wherein the portion of the combination dimension members comprises combination dimension members associated with a zero or no data.

16. The system of claim 14, wherein suppressing the portion of the combination dimension members comprises zeroing, based on a variance threshold, a second portion of the combination dimension members.

17. The system of claim 11, wherein generating the third set of combination dimension members using the refreshed first set of combination dimension members and the refreshed second set of combination dimension members comprises inversing values associated with the refreshed second set of combination dimension members.

18. The system of claim 11, wherein generating the third set of combination dimension members using the refreshed first set of combination dimension members and the refreshed second set of combination dimension members comprises combining the refreshed first set of combination dimension members and the refreshed second set of dimension members into a linear format.

19. The system of claim 11, wherein the first dataset and the second dataset each comprise numerical values.

20. The system of claim 11, wherein the operations further comprise sending the data reconciliation report to the user device, wherein receiving the data reconciliation report causes the user device to display the data reconciliation report via a graphical user interface.

* * * * *